June 29, 1937.  V. F. LUCHT ET AL  2,085,032
GEARING
Filed May 4, 1936
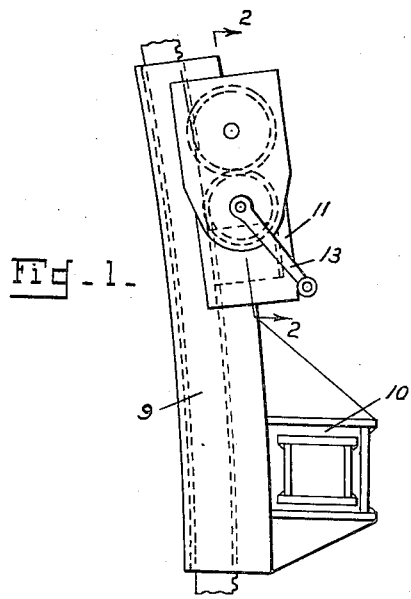
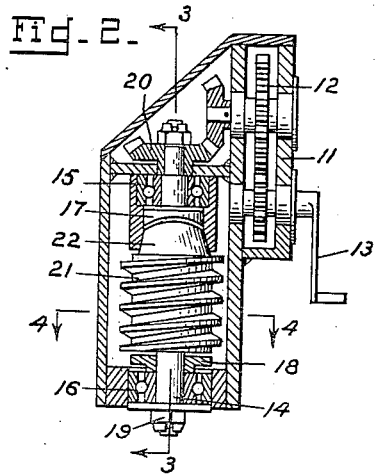
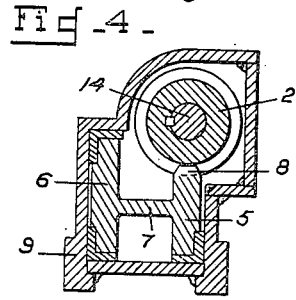
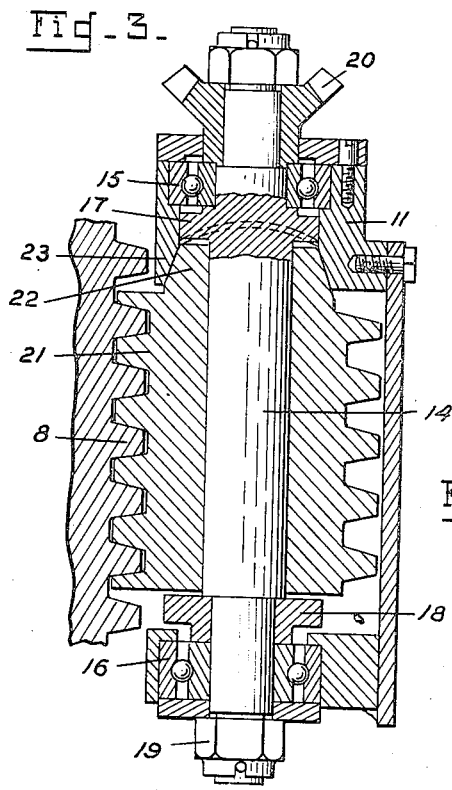
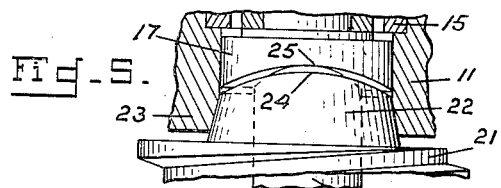
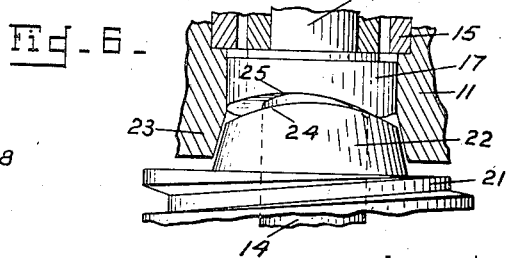
Inventors
Victor F. Lucht
Elmer C. Goebert
By W. N. Roach
Attorney

UNITED STATES PATENT OFFICE 2,085,032

GEARING

Victor F. Lucht, Aberdeen, Md., and Elmer C. Goebert, Philadelphia, Pa.

Application May 4, 1936, Serial No. 77,767

5 Claims. (Cl. 74—425)

(Granted under the act of March 3, 1883, as amended April 30, 1928; 370 O. G. 757)

The invention described herein may be manufactured and used by or for the Government for governmental purposes without the payment to us of any royalty thereon.

This invention relates to gearing.

The purpose of the invention is to provide gearing in which a worm of the non-locking type is held against rotation when it ceases to be driven. This is accomplished by arranging the worm casing to be normally in braking engagement with the worm due to the influence of gravity and by arranging the worm driving mechanism so that upon initiation of its movement the casing will be moved out of braking engagement with the worm.

A further object is to provide a novel arrangement for clutching the shaft to the worm.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of a carriage slidable on a support and containing the improved gearing.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

Fig. 5 is an enlarged view in side elevation of the cam members and showing them in separated position.

Fig. 6 is a similar view with the cam members in contact.

Referring to Figs. 1-3 there is shown an upright support comprising a pair of spaced rails 5 and 6 connected by a web 7. The rail 5 constitutes a rack and is provided with worm teeth 8. A carriage 9 slidably mounted on the support has a frame 10 on its lower end which is adapted to carry a load. A casing 11 on the upper end of the carriage carries a train of gears 12 actuated by a handwheel 13.

A shaft 14 (Fig. 3) mounted in anti-friction bearing units 15 and 16 in the casing 11 is provided with collars 17 and 18 positioned between the units 15 and 16 and respectively abutting the inner races thereof. The shaft extends through the bearing units and has a nut 19 on its lower end and on its upper end a bevel gear 20 meshing with and actuated by the train of gears 12.

A worm 21 meshing with the rack is freely mounted on the shaft 14 and is arranged to have a slight axial displacement between the collars 17 and 18. The upper end of the worm includes a tapered extension 22 forming the inner element of a cone-type brake, the outer element 23 of which is formed in the casing 11. The end face of the tapered extension 22 and the adjacent face of the collar 17 are each formed with a pair of complementary cams, respectively 24—24 and 25—25. The surfaces of each cam are right and left helix angles which are greater than the angle of repose.

In the normal position of rest the parts have the relationship shown in Figs. 5 and 6, the cone brake being engaged and the weight of the carriage 9 exerting a wedging action which locks the worm 21 against rotation. When it is desired to move the carriage on the upright support the handwheel 13 is acted on to drive the train of gears 12 and 20 and rotate the shaft 14. Upon rotation of shaft 14 the cams 25 of the collar 17 are brought into contact with the cams 24 on the worm 21 and since the worm is in mesh with the rack 5 the resulting cooperating action will be an elevation of the carriage 9, gear casing 11 and shaft 14 and a consequent separation of the elements 22 and 23 of the cone brake. At the same time the worm becomes wedged between the collars 17 and 18 so that it will then be driven by the shaft.

When action on the handwheel 13 is discontinued the weight of the carriage is taken on the cams 24 and 25 and since the inclination of the cams is greater than the angle of repose the weight of the carriage will act through the cams to produce rotation of the shaft and consequent lowering of the carriage and shaft until the braking surfaces of the elements 22 and 23 are in engagement. The worm is now locked against rotation.

This arrangement makes possible the employment of a non-locking and highly efficient type of worm gearing while eliminating the possibility of the worm running down the rack.

We claim.

1. A support including an upright rack, a casing slidably mounted on the support, bearings in the casing, a shaft mounted in the bearings, an upper and a lower collar on the shaft between the bearings, cams on the under face of the upper collar, a worm loose on the shaft between the collars and meshing with the rack, a tapered extension on the upper end of the worm and forming an element of a cone brake, cams on the upper face of said extension, and a complementary element of a cone brake on the casing.

2. A support including an upright rack, a casing slidably mounted on the support, a shaft mounted in the casing, an upper and a lower collar on the shaft, a worm loose on the shaft between the collars and meshing with the rack, complementary cam members on the upper collar and the upper end of the worm, and complementary elements of a cone brake on the casing and the upper part of the worm.

3. A support including an upright rack, a casing slidably mounted on the support, a shaft mounted in the casing, a worm loose on the shaft and meshing with the rack, means on the shaft and worm and operable on initial rotation of the shaft to axially displace the shaft and casing and establish driving connection between the shaft and worm, and cooperating elements on the casing and worm whereby the casing normally holds the worm against rotation, said casing being disengageable from the worm when the casing is axially displaced.

4. A support including an upright rack, a casing slidably mounted on the support, a shaft mounted in the casing, a worm loose on the shaft and meshing with the rack, means whereby the casing normally engages the worm to hold it against rotation, cooperating cam members on the shaft and the worm, said cam members having coacting surfaces greater than the angle of repose.

5. A support including an upright rack, a casing slidably mounted on the support, a shaft mounted in the casing, a worm loose on the shaft and meshing with the rack, means whereby the casing normally engages the worm to hold it against rotation, cooperating cam members on the shaft and the worm, and whereby the shaft is axially displaced on its initial rotation.

VICTOR F. LUCHT.
ELMER C. GOEBERT.